May 23, 1944.   A. W. CAPS ET AL   2,349,337
PHOTOGRAPHIC PRINT TREATING APPARATUS
Filed Dec. 11, 1942   9 Sheets-Sheet 1

INVENTORS
Arthur W. Caps
Paul Landrock
BY Cumpston & Shepard
their Attorneys

May 23, 1944. A. W. CAPS ET AL 2,349,337
PHOTOGRAPHIC PRINT TREATING APPARATUS
Filed Dec. 11, 1942  9 Sheets-Sheet 2

INVENTORS
Arthur W. Caps
Paul Landrock
BY Cumpston & Shepard
their Attorneys Patented May 23, 1944

2,349,337

UNITED STATES PATENT OFFICE 2,349,337

PHOTOGRAPHIC PRINT TREATING APPARATUS

Arthur W. Caps and Paul Landrock, Rochester, N. Y., assignors to Photostat Corporation, Providence, R. I., a corporation of Rhode Island Application December 11, 1942, Serial No. 468,628

14 Claims. (Cl. 95—94)

This invention relates to photographic print treating apparatus of the type adapted for treating prints in the form of separate sheets, as delivered, for example, by known varieties of cameras for copying documents and the like, one object of the invention being to provide a simple and efficient apparatus of the above character for receiving the exposed prints successively from a camera and rapidly immersing the same in one or more treating baths.

Another object is to afford an apparatus particularly adapted for use with cameras delivering prints individually in separate sheets where the delivery cannot be conveniently made to a dark room.

Another object is to provide such a print treating apparatus of a portable character and capable of being rapidly and conveniently operated by hand, for use with commercial copying cameras, for example, of medium operating speed and capacity.

Another object is to afford a more practical apparatus of the character described, adapted to treat the sheets in rapid succession by means of print contacting parts so constructed as to avoid adherence of the wet sheets thereto and to avoid any sharp bending or other distortion of the sheets.

A further object is to provide such an apparatus so constructed as to be readily separable into its component parts, to afford convenient access to the same for the removal of the treated prints, for replenishment of the treating baths, and for general access to the parts for cleaning and repair.

To these and other ends the invention resides in certain improvements and combinations of parts, all as will be hereinafter more fully described, the novel features being pointed out in the claims at the end of the specification.

In the drawings:

Fig. 13 is a transverse elevation of portions of the mechanism detached from the casing.

Figure 1:
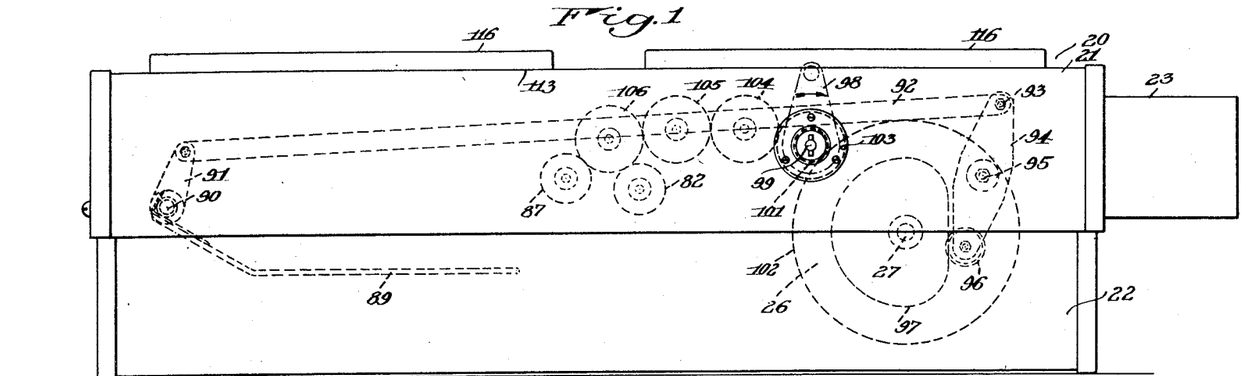
Fig. 1 is a side elevation of a print developing and fixing apparatus embodying the present invention, certain parts of the mechanism being shown in dotted lines in one position thereof.
Figure 3:
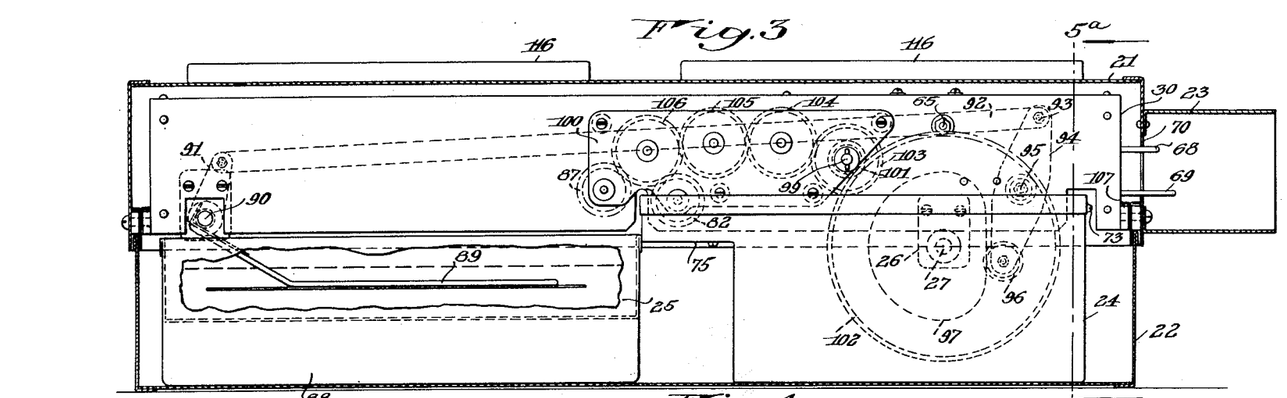
Fig. 3 is a longitudinal, sectional elevation on the line 3a—3a in Fig. 5.

The embodiment of the invention herein disclosed, by way of illustration, comprises, preferably, a light-tight, sheet metal casing, indicated generally at 20, Fig. 1, including an upper half portion 21, separably supported upon a lower half portion 22, and connected therewith by a light-tight joint, hereafter described. The upper casing portion contains the print handling mechanism, to one end of which the prints are supplied through an opening in the casing within a sleeve 23. The sleeve is adapted for light-tight, telescopic association with the delivery chute of a camera, such as the outer end of the conveyor housing 124 of our copending patent application, Serial No. 460,972, filed October 6, 1942. The lower half of the casing holds a pair of separately formed, open topped, containers 24 and 25, Fig. 3, for the developer and fixer or "hypo" baths, respectively.

Figure 5:
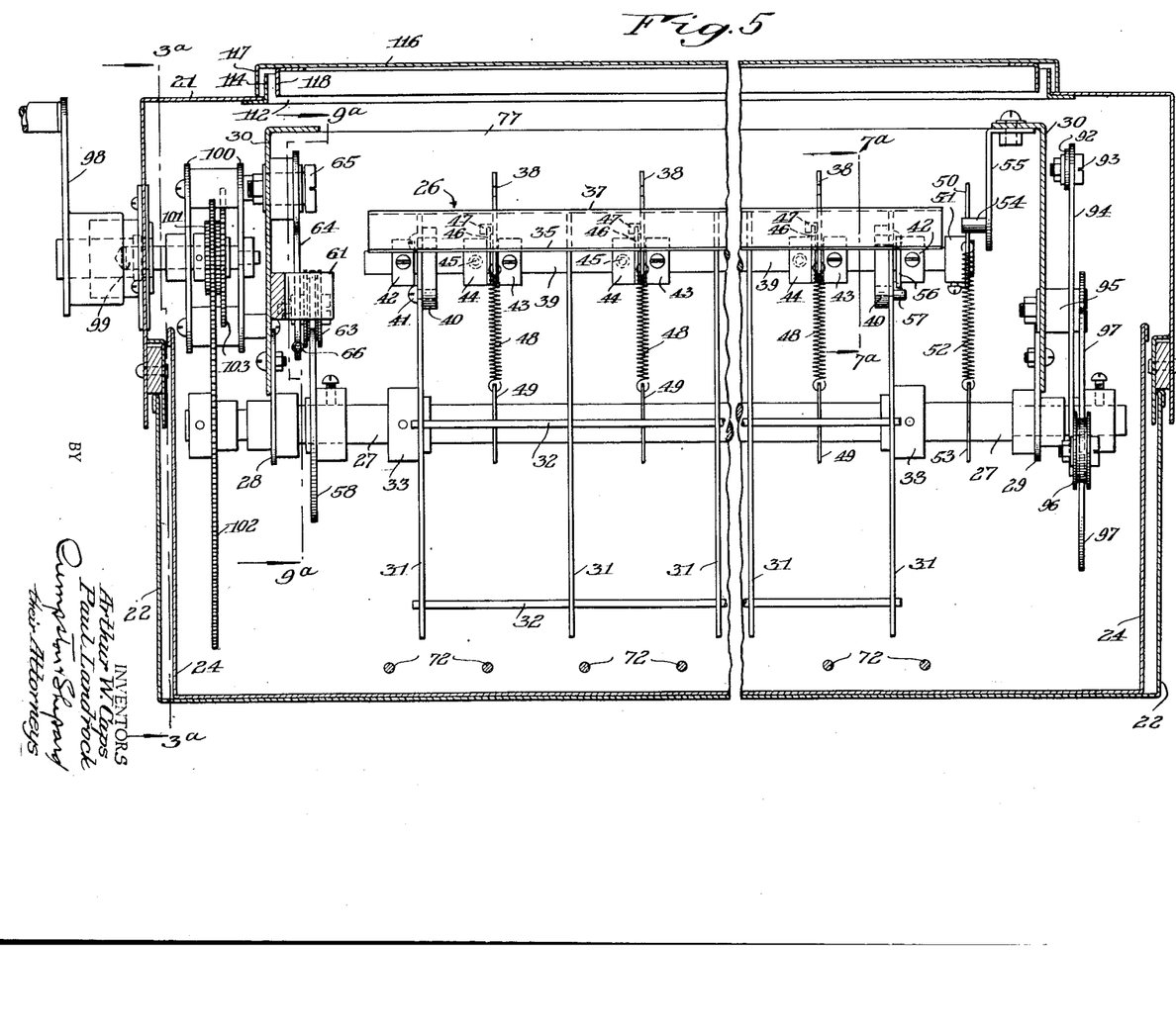
Fig. 5 is an enlarged, transverse, sectional elevation on the line 5a—5a in Fig. 3.
Figure 10:
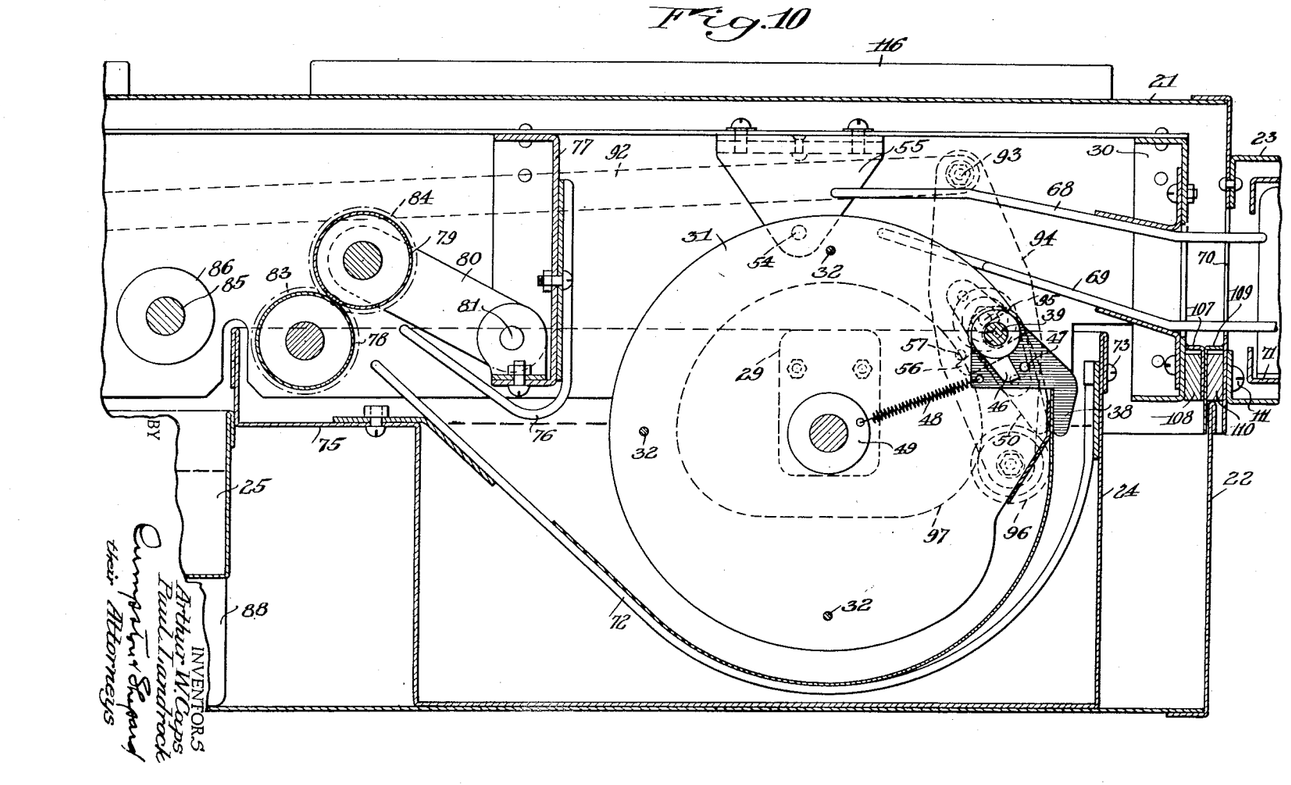
Fig. 10 is a view similar to Fig. 6, but showing the parts in a different position of operation.

The print receiving end of the apparatus preferably comprises a print handling device 26, Figs. 5 and 13, of generally cylindrical or drum-like shape in outline, provided with fingers for gripping the leading edge of a print and mounted for rotary oscillation to immerse the print in the developer bath. Drum 26 is fixed on a shaft 27, rotatably mounted at its ends in spaced hanger plates 28 and 29, fixed to and depending from a rectangular frame 30, Figs. 5 and 10, fixed in the upper half 21 of the casing, as hereafter described. Drum 26 preferably comprises a series of disks 31, spaced from each other longitudinally of the supporting shaft 27. The disks are connected to one another by longitudinal brace rods 32, extending through their peripheral portions, and the end disks are mounted on hubs 33, pinned to shaft 27. The disks have outlines which are generally circular but formed with shallow, alined recesses 34, Fig. 6, in which is positioned the outwardly inclined edge 35 of a longitudinal plate 36, fixed to the disks and having its opposite edge 37 lying on the adjacent peripheral portions of the disks at which they have their full diameter. Plate portions 37 provide one element of each of a plurality of gripping elements or fingers for engaging the print.

The print gripping elements preferably comprise, in addition to the above plate portion 37, a series of fingers 38, spaced transversely of the apparatus and longitudinally of a shaft 39, passing through alined openings in disks 31, and oscillating in bearings 40, fixed to the end disks, as by means of screws 41. Collars 42 are fixed to the shaft to prevent its endwise movement.

Figure 12:
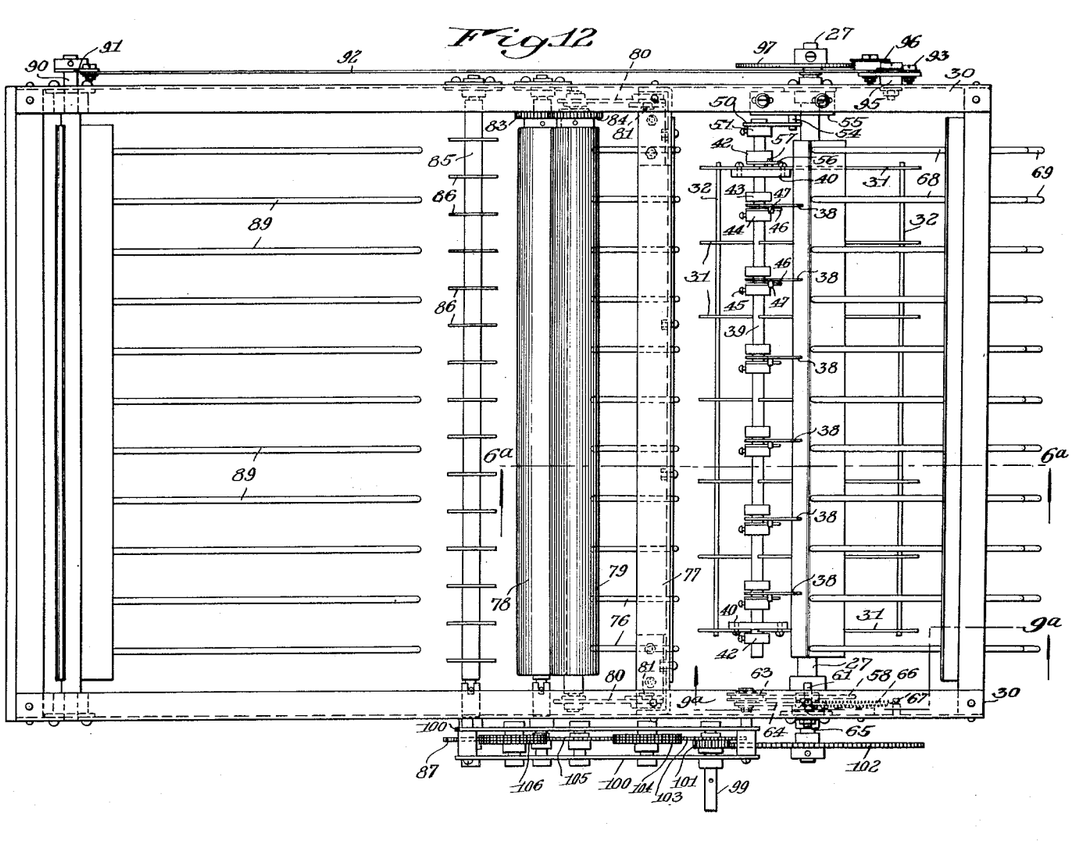
Fig. 12 is a top plan view of the apparatus with parts of the casing removed.

Each gripping finger 38 is mounted for oscillation on shaft 39, Fig. 12, between collars 43 and 44. Each collar 44 is rotatably adjustable on the shaft, as by means of a set screw 45, and carries an arm 46, for engagement with a pin 47, fixed in the adjacent finger 38, for oscillating the finger against the tension of a spring 48 attached to the finger and to a disk 49, on shaft 27. By this means, the fingers 38 may all be raised simultaneously by the oscillation of shaft 39, by means hereafter described.

Figures 6, 7:
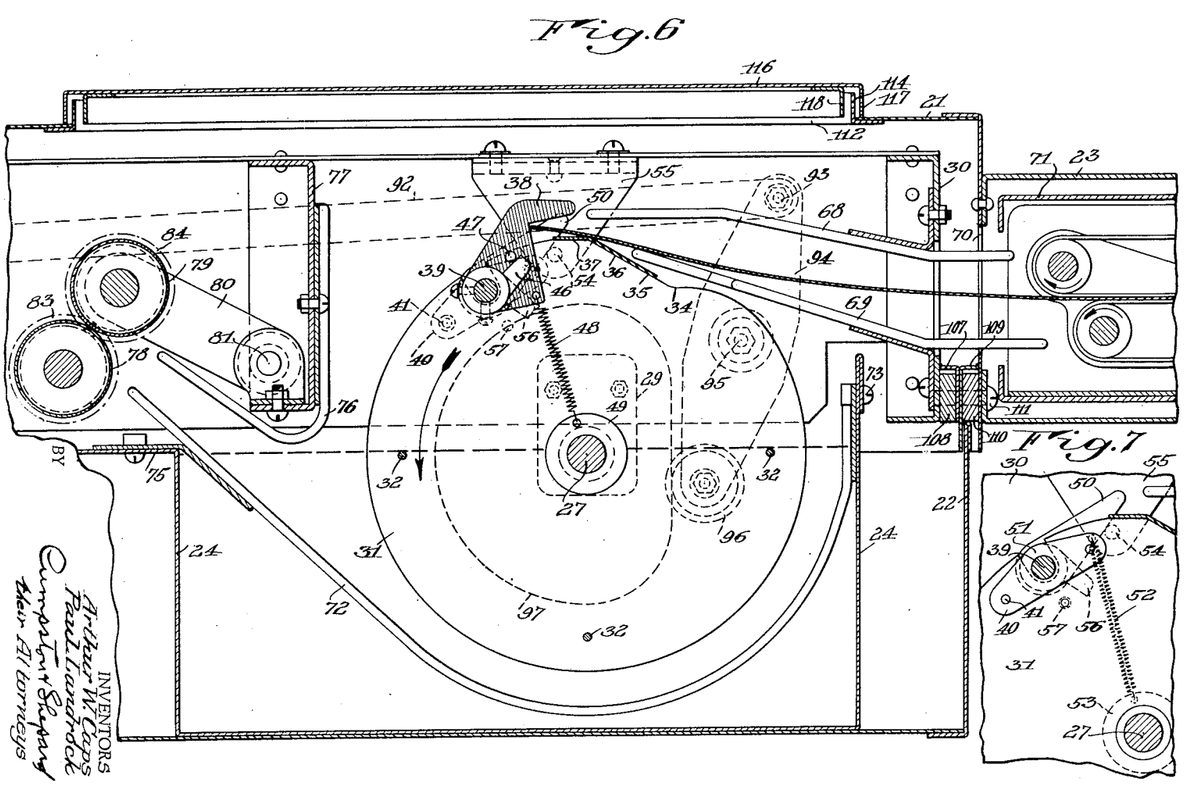
Fig. 6 is an enlarged, longitudinal, sectional elevation of a portion of the apparatus on the line 6a—6a in Fig. 12, showing the parts in one position of operation.
Fig. 7 is a fragmentary, sectional elevation on the line 7a—7a in Fig. 5.

The means for oscillating shaft 39 to actuate the gripping fingers 38 comprises preferably a dog 50, Figs. 5, 6 and 7, fixed on a hub 51, fixed on shaft 39, as shown. A coiled tension spring 52, fixed at one end to a collar 53, on shaft 27, has its opposite end fixed to the dog to oscillate it and shaft 39 in one direction. The dog is arranged to engage a pin 54, on a hanger 55, on frame 30, whenever drum 26 is in its initial position, Figs. 5, 6 and 7, the dog being thereby raised to oscillate the shaft against the tension of spring 52 and raise fingers 38 to print receiving position, as shown in Figs. 6 and 7. The oscillation of shaft 39 in the opposite direction is limited by a dog 56, fixed on adjacent collar 42, for engagement with a pin 57, fixed in the adjacent disk. Before the dog engages the pin, to stop the shaft, however, the ends of fingers 38 are arranged to engage a print on plate 37, so that the gripping force of the fingers is applied yieldably and individually by their respective springs 48.

Figure 4:
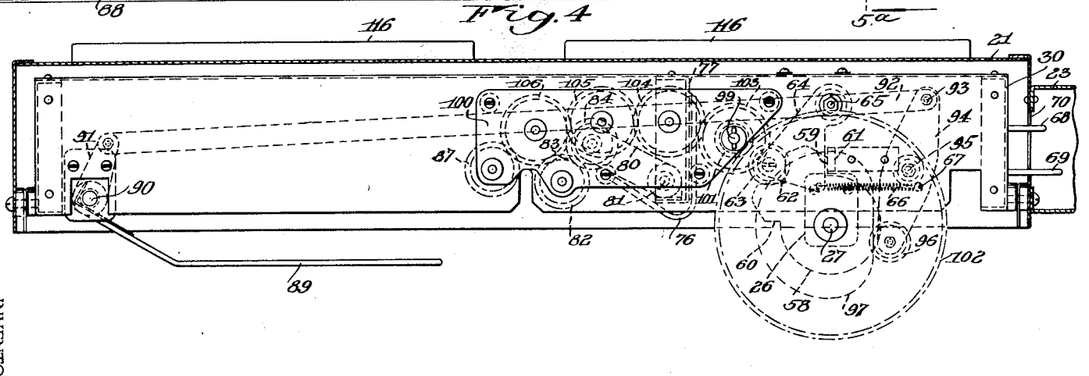
Fig. 4 is a similar view of the detached upper portion of the apparatus.
Figure 9:
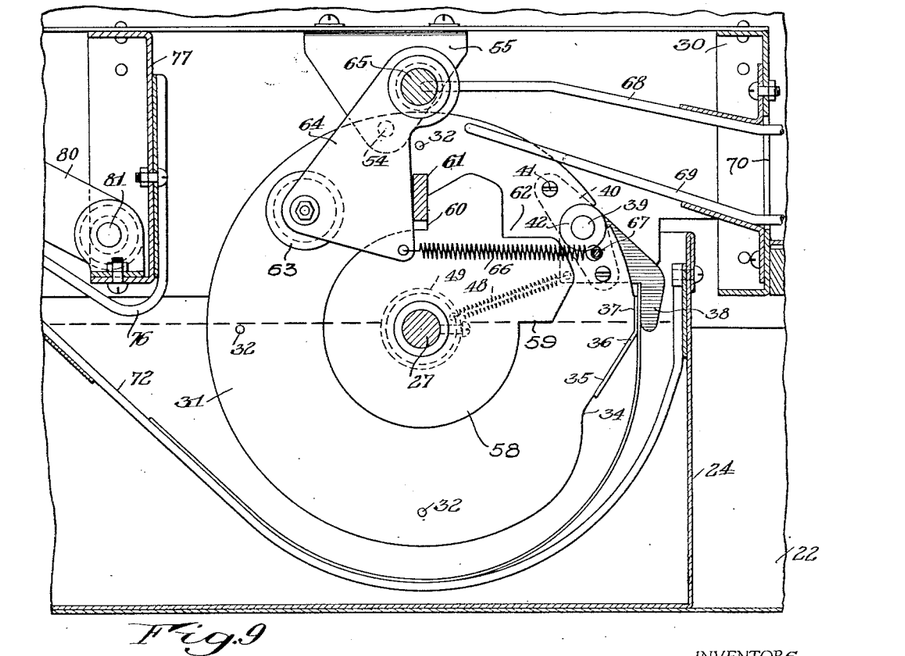
Fig. 9 is a longitudinal, sectional elevation of parts of the apparatus on the line 9a—9a in Fig. 5.

Means are provided for stopping the oscillations of the drum 26 in its extreme positions and for yieldably retaining it in initial position. To this end, shaft 27 has fixed thereon, at one end of the drum an irregularly shaped plate 58, formed with opposing stop shoulders 59 and 60 (Figs. 5 and 9), located approximately 270° apart. Lying in the path of these shoulders is a stationary lug 61 projecting inwardly from the wall of the frame 30. As the drum is returned to initial position, shoulder 59 engages lug 61 and stops the drum in that position, as indicated in Fig. 4. When the drum is turned counterclockwise to immerse a print, as shown in Fig. 9, shoulder 60 strikes lug 61 and limits the oscillation of the drum in the opposite direction. Between the shoulders 59 and 60, the stop plate 58 is formed with a V-shaped recess 62 for the purpose described below.

The means for yieldably retaining the drum in initial or print receiving position comprises, preferably, a grooved roller 63, on the outer end of an arm 64, pivoted on a stud 65, projecting from a wall of the frame 30. A coiled tension spring 66 is fixed at one end to arm 64 and at the other to a pin 67 projecting from frame 30 and urges roller 63 toward the stop plate so as to drop into recess 62, when the drum reaches initial position, to thereby serve as a yieldable detent for holding the drum in such position.

Means are provided for guiding the print in its movement to the immersing drum 26, comprising, preferably, an upper series of laterally spaced guide rods 68, and a lower series of guide rods 69, spaced below said upper series to confine the movement of the print therebetween. These guide rods are supported by attachment to suitable brackets on the frame 30 and they extend at their outer ends through an opening 70 in the end of casing portion 21, into the sleeve 23 and adjacent the delivery end 71 of the conveyor housing or chute of the associated camera, as best shown in Fig. 6. The guide rods have their inner ends extended adjacent the periphery of drum 26 where they converge, so as to deliver the leading edge of a print on plate 36 and beneath the gripping fingers which are raised in the initial or receiving position of the immersing drum.

As the print is immersed in the developing bath by the oscillation of the drum, its free portion is supported and guided by a series of laterally spaced guide rods 72, fixed at one end, 73, to the wall of the bath container 24. Rods 72 are curved concentrically but in spaced relation with the periphery of drum 26, having their opposite ends supported on the bottom of an extended portion 75 of container 24, for delivering the free or trailing edge of the print to feeding means hereafter described, for advancing it to the container 25 for the fixing bath. An upper series of short curved guide rods 76 are suitably fixed at one end in laterally spaced relation on a transverse element 77 of frame 30, Figs. 6 and 10. The opposite ends of rods 76 are spaced above the ends of rods 72, to confine the print to its intended path.

The means for feeding the print from the oscillating immersing drum 26 to the fixing bath comprises, preferably, a feed roll 78, journalled at its ends in fixed bearings in the opposite side walls of frame 30, adjacent the delivery ends of the guide rods 72 and 76. Cooperating with roll 78 is a roll 79, journalled at its ends in arms 80, pivoted at 81 on frame element 77, Figs. 10 and 11, these parts being so arranged that the weight of the upper roll 79 urges it toward roll 78, so that an interposed print is gripped with substantial pressure. Roll 78 has fixed on one of its shaft a gear 82, engaged with a driving gearing, hereafter described. Roll 78 has fixed on the other end of its shaft a gear 83, Fig. 12, meshing with a gear 84 having an equal number of teeth and fixed on the corresponding end of the upper feed roll 79, so that these rolls are both driven positively and at the same speed. These feed rolls 78 and 79 serve also as squeegee rolls for pressing out the developer fluid from the print above the extension 75 of the container, so that it flows back into the main body of fluid in the container 24. A further feeding means is provided in a rotary spindle 85, carrying a laterally spaced series of disks 86. Fixed on one end of the spindle is a gear 87, engaged by the driving gearing hereafter described. It will be evident from the above description that a print delivered by the feed rolls, 78 and 79, passes over the rotary disks 86, which feed and deliver the print to the fixing bath in container 25 over which the disks 86 are located.

Figure 2:
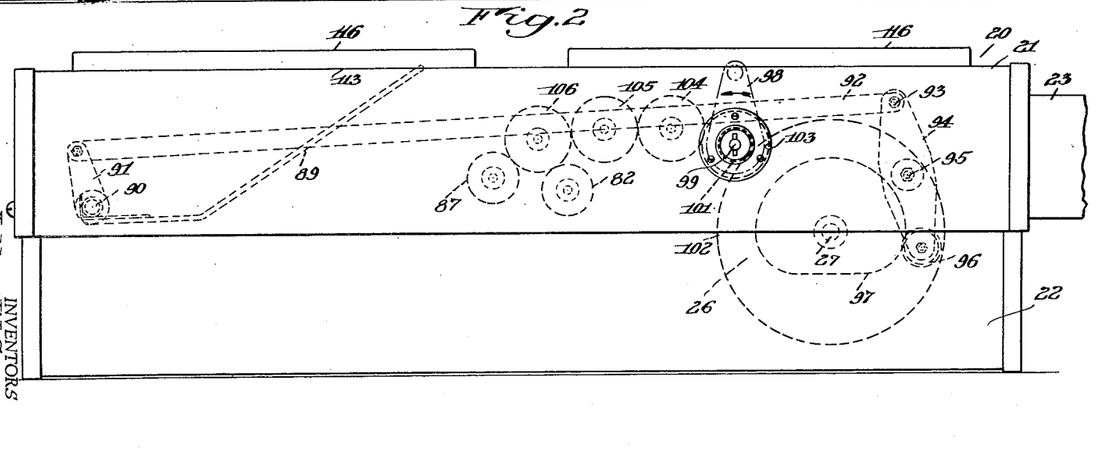
Fig. 2 is a similar view with the parts shown in a different position.
Figure 11:
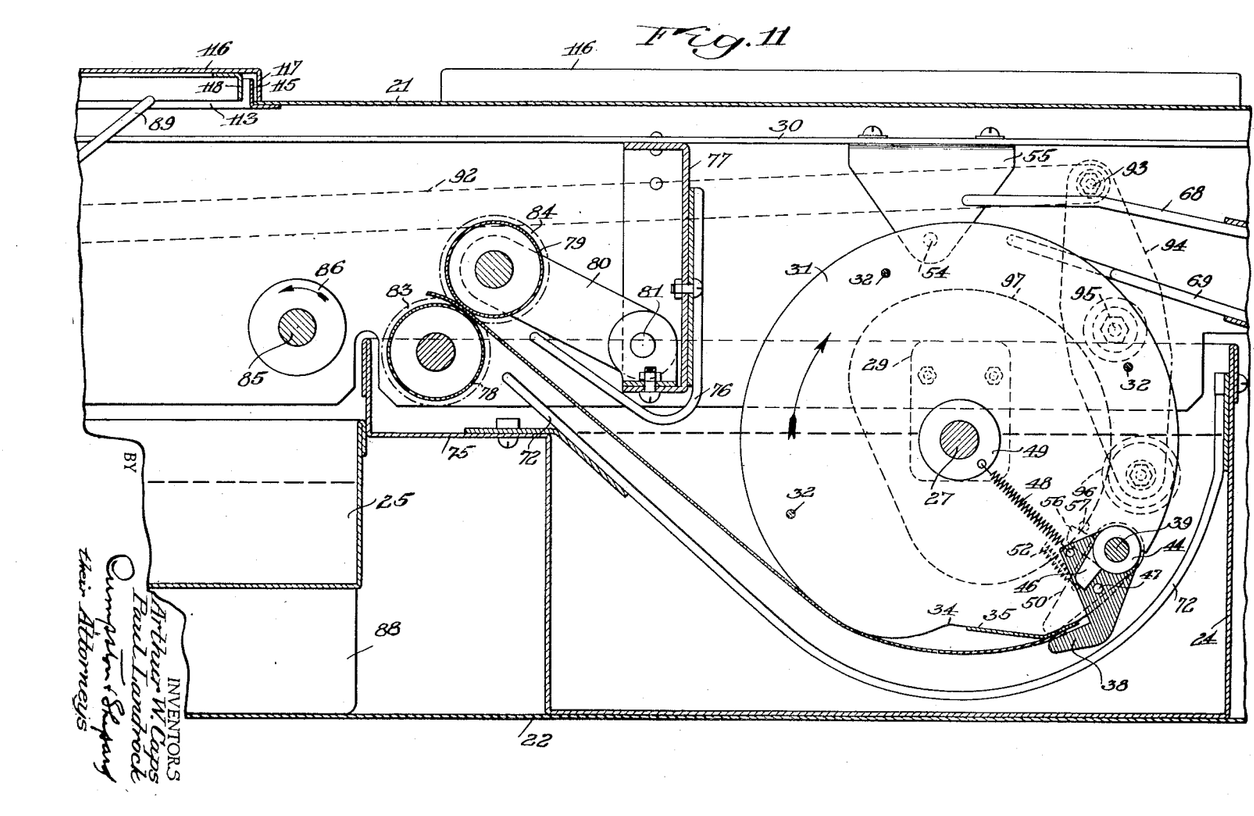
Fig. 11 is a similar view with the parts in still a different position.

The fixing fluid, or "hypo," is held in container 25 which has supporting standards 88, resting on the bottom of the lower casing portion 22. Means is provided for immersing the print in the bath, comprising, preferably, a series of laterally spaced rods 89, Figs. 1 to 5, 11 and 12, fixed at one end to a spindle 90, journalled at its ends in the opposite side walls of frame 30. Rods 89 are alternately raised above the path of the print and lowered to immerse it by means comprising, preferably, an arm 91, fixed on spindle 90 at one end thereof, and pivoted to a link 92 extending longitudinally along the outer side of frame 30 adjacent the immersing drum 26. At this opposite end, link 92 is pivoted at 93 to one end of a lever 94, pivoted at 95 on frame 30 and carrying at its opposite end a roller 96, engaging the periphery of a disk cam 97, fixed on shaft 27 of the immersing drum. It will be seen from this description that as the drum oscillates, cam 97 oscillates the lever 94 and link 92 to first raise rods 89 to receive the print, as shown in Figs. 2 and 11, and then permit them to drop by gravity on the print to immerse it in the fluid, the connection of these parts being such that the action of the immersing rods 89 is coordinated and begun with the action of the immersing drum 26 and the intermediate print feeding means, so that as soon as a print is delivered from the developing bath, it is rapidly immersed in the fixing bath.

Figures 14, 15:
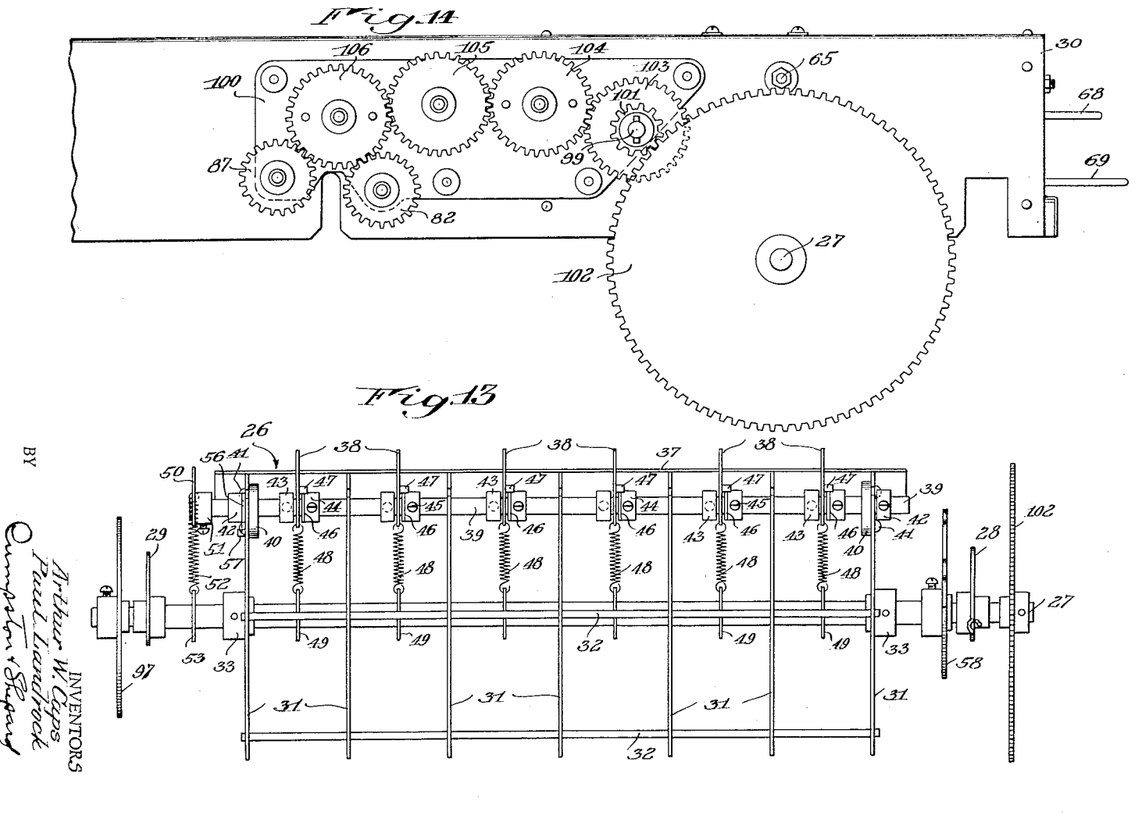
Fig. 14 is an enlarged, side elevation of a portion of the apparatus shown in Fig. 12.

The driving mechanism may be operated by any suitable motive power, being shown in the present instance as actuated by a manual means or crank 98, Fig. 5, fixed exteriorly of the upper casing portion 22, on the outer end of a short shaft 99, extending through the casing and journalled in the spaced plates 100 of a frame for supporting the driving gearing. Within the frame, the shaft has fixed thereon a pinion 101, Figs. 12 and 14, meshing with a large gear 102, fixed on the end of the shaft 27, for oscillating it as described. The gearing shaft 99 has fixed thereon also a gear 103, meshing with a series of drive transmitting gears 104, 105, and 106. Gear 106 meshes with gear 82, which drives feed rolls 78 and 79 and also with gear 87 which drives spindle 85 and its feeding disks 86.

It will be apparent from the above description that the driven operating parts and the driving gearing for the same are mounted in the frame 30, which is secured within the upper casing portion 22, so as to be conveniently assembled in a single accessible unit. For this purpose, the bottom of the side walls of frame 30 is preferably provided with a channel-shaped portion 107, Figs. 6 and 10, containing a stiffening and supporting bar 108. The bottom of the side walls of the upper casing portion 22 is likewise provided with a channel-shaped portion 109 containing a stiffening and supporting bar 110. Channel portion 107 projects outwardly from frame 30 and channel 109 inwardly from casing portion 22, and these channel portions are detachably secured together as by means of the screws 111, thus conveniently spacing the frame 30 from the casing, as shown.

Frame 30 is accessibly open at its top and the top of casing portion 22 is formed with a pair of openings 112 and 113, about which are upwardly extending flanges 114 and 115. Small cover plates, as 116, have spaced depending flanges 117 and 118, for receiving between them the upwardly extending flanges of the casing top, so that the covers may be readily removed for access to the interior of the casing, but maintain a light-tight relation with the casing when in closing position. Channel 109 of the casing portion 22 extends below its stiffening bar 110 for telescoping engagement with the upper edge of the side walls of the lower casing portion 22, so that the upper casing portion may be readily detached with its operating parts, as shown in Fig. 4, but maintains a light-tight connection with the lower casing part 23 when placed thereon.

Figure 8:
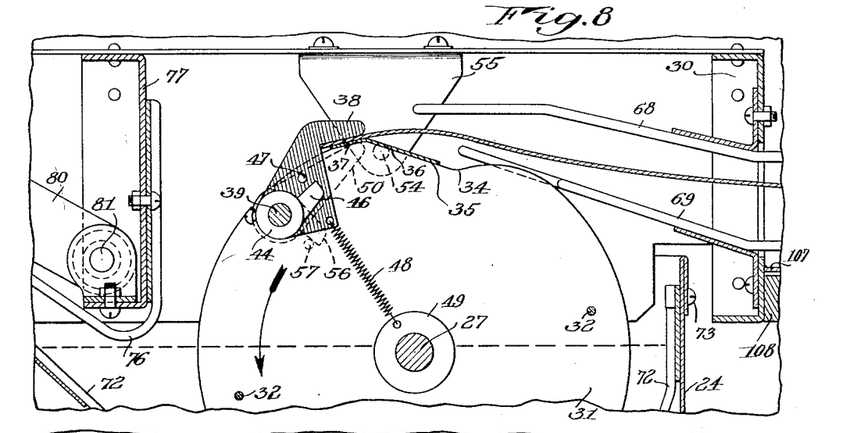
Fig. 8 is a view similar to Fig. 5, partly broken away, and showing the parts in a different position of operation.

The operation will be apparent from the above description. With the apparatus located to telescope its receiving sleeve 23 with the delivery chute of the camera, a print delivered from the camera is inserted into the apparatus, as shown in Fig. 6, with its leading edge beneath the raised gripping fingers 38, which serve to stop the print in that position. The operating crank 98 is then rotated clockwise to rotate the drum 26 counterclockwise, as viewed in Fig. 6. As dog 50 of the drum leaves pin 54, Fig. 8, fingers 38 are closed by their springs 48 to grip the leading edge of the print against plate 36, to engage and advance the print.

Continued oscillation of the drum carries the print through the developing bath, Fig. 9, until the drum is stopped by engagement of shoulder 60 with stop plate 61. Crank 98 is then reversed to reverse the drum, which pushes the opposite free edge of the print along the guide rods 72 and 76, out of the developing bath, to the rotating feed rolls 78 and 79 by which the print is gripped and stripped away from the fingers 38. The rolls press out the developing fluid which falls back into its container 74, the print being delivered to the feeding disks 86, by which it is advanced into the fixing bath in container 25. At this time the immersing rods 89 are held elevated by the high portion of cam 97 in contact with the roller 96, Fig. 11, so as not to interfere with the advance of the print. After delivery of the print into container 25, continued rotation of crank 98 brings the low portion of cam 97 against roller 96, so that the immersing rods 89 are lowered (Figs. 3 and 4), to immerse the print in the fixing bath. When a suitable number of prints have been collected in the fixing bath, the cover or casing opening 113 is removed, rods 89 are raised and the prints are lifted out of the fixing bath through the casing opening, or, if desired, the upper portion 22 of the casing may be removed from the lower portion containing the treating bath.

The invention thus supplies a simple, portable apparatus which may be easily and conveniently annexed to the delivery chute of a camera of the type indicated, for rapidly treating the prints, at the position of the camera and without resort to a dark room. The prints are loosely wound on the narrow peripheries of the disks forming the drum or cylinder 25 which, with the gradually curved guide rods 72 and the feeding rolls between the bath containers, engage and advance the prints without any sharp bending or stretching. The peripheries of the drum disks, as well as the guide rods 72 and 76, provide narrow print engaging surfaces extending parallel with the direction of feed, freely admitting the bath to both surfaces of the print, and thus handle the prints with a minimum of adherence to the contacting surfaces. By means of such provisions, the prints are handled without stretching, folding, or other derangement and are thus smoothly transmitted through the apparatus to the final bath in which they lie in a flat and undistorted condition. As delivered from the camera, single coated prints are preferably positioned with the emulsion side downwardly, are inverted by the oscillating drum and arrive in the final bath, therefore, face side uppermost, so that they may be readily inspected for confirming the quality of the work.

It will thus be seen that the invention accomplishes its objects, and while a preferred embodiment has been herein disclosed in detail, it is to be understood that such disclosure is intended to be merely illustrative and not limiting in sense, as it is contemplated that various modifications in the construction and arrangement of the parts will readily occur to those skilled in the art within the spirit of the invention and the appended claims.

We claim:

1. A photographic print treating apparatus, comprising a casing having therein a container for a print treating bath and an opening for receiving a print to be treated, a movable device having means for engaging the leading edge of a print inserted through said opening, print guiding means in said container, print feeding means, and actuating means for moving said device in one direction to immerse said print in said bath and for subsequently moving said device in another direction to advance the opposite edge of said print along said guiding means to said feeding means.

2. A photographic print treating apparatus, comprising a casing having therein a container for a print treating bath and an opening for receiving a print to be treated, a device mounted for rotary oscillation and having means for engaging the leading edge of a print inserted through said opening and supporting the print by contact therewith at spaced points only to subject both opposite surfaces of said print to said bath, print guiding means in said container, print feeding means, and actuating means for oscillating said device to first immerse said print in said bath and subsequently advance the opposite edge of said print along said guiding means to said feeding means for feeding it out of said bath.

3. A photographic print treating apparatus, comprising a casing having therein a container for a print treating bath and an opening for receiving a print to be treated, a movable device having means movable thereon to grip the leading edge of a print inserted through said opening and having spaced projecting portions for contact with spaced portions only of said print to subject both opposite surfaces thereof to said bath, print guiding means in said container, print feeding means, and actuating means for moving said device and said gripping means to grip the leading edge of a print inserted through said opening and to first move said print in one direction through said bath and subsequently move said print in the opposite direction to advance its opposite edge along said guiding means to said feeding means for feeding said print out of said bath.

4. A photographic print treating apparatus, comprising a container for a print treating bath, a device having means for engaging the edge of a print fed thereto, said device having the general shape of a cylindrical drum formed by spaced portions arranged for contact with spaced portions only of said print to subject both opposite surfaces thereof to said bath, means supporting said device for rotary oscillation with the lower portion of its periphery in said container, guide means in said container below said device, and means for oscillating said device in opposite directions to first wind a print on said device to immerse the same in a bath in said container and to subsequently advance the opposite free edge of said print along said guide means out of said bath.

5. A photographic print treating apparatus, comprising a container for a print treating bath, a device having a foraminous peripheral portion of generally cylindrical shape and of substantial diameter adapted to have a print wound thereon without sharply bending or adhering to the same, means on said device for engaging the edge of a print fed thereto, said device being mounted for rotary oscillation with its lower peripheral portion extending into said container, print guiding means in said container below said device, and means for oscillating said device in one direction to wind a print thereon and immerse the same in a bath in said container and in the opposite direction to advance the opposite free edge of said print along said guiding means out of said bath.

6. A photographic print treating apparatus, comprising a container for a print treating bath, a device of generally cylindrical outline comprising a plurality of axially spaced, concentric disks, said device being mounted for rotary oscillation with the lower portion of said disks in a bath in said container, means on said device for gripping the edge of a print fed thereto, a plurality of guide rods in said container below said device, said guide rods being arranged in circumferentially extending, axially spaced relation to said device, and means for oscillating asid device in one direction to wind a print on said disks and immerse the same in a bath in said container and in the opposite direction to advance the opposite free edge of said print along said guide rods out of said container.

7. A photographic print treating apparatus, comprising a container for a print treating bath, a device having a generally cylindrical outline with a foraminous periphery adapted to support a print without sharply bending or adhering to the same, said device being mounted for rotary oscillation toward and from an initial print receiving position, means movably positioned on said device for engaging the edge of a print fed thereto, mechanism for operating said print engaging means on movement of said device toward and from initial position, foraminous print guiding means in said container below said device, and means for oscillating said device in opposite directions to first engage and wind a print thereon to immerse the same in a bath in said container and to subsequently move the opposite free edge of said print along said guiding means out of said bath.

8. A photographic print treating apparatus, comprising a light-tight casing having therein a container for a print treating bath and an opening for receiving a print to be treated, a device movable toward and from an initial position and having gripping means movable thereon to grip the leading edge of a film inserted through said opening, mechanism for moving said print gripping means to print receiving position when said device is moved to said initial position, print guiding means in said container, print feeding means, and actuating means for moving said device to move said means to grip said print and to move said print in one direction through said bath and subsequently move said print in the opposite direction to advance the trailing edge of said print along said guiding means to said feeding means for feeding said print out of said bath.

9. A photographic print treating apparatus, comprising a casing having therein a container for a print treating bath and an opening for receiving a print to be treated, a device movable toward and from an initial position and having a plurality of gripping fingers independently mounted thereon for gripping the leading edge of a print inserted through said opening, a spring for independently moving each of said fingers to gripping position, mechanism for moving all of said fingers to print receiving position when said device is moved to initial position, print guiding means in said container, print feeding means, and actuating means for moving said device from said initial position to an intermediate position and back to said initial position, for actuating said fingers to grp said print and for moving said print in one direction through said bath and subsequently moving the same through said bath in the opposite direction to advance the trailing edge thereof along said guiding means to said feeding means for feeding said print out of said bath.

10. A photographic print treating apparatus, comprising a light-tight casing having therein a plurality of containers for print treating baths and an opening for receiving a print to be treated, a movable device having means for engaging the leading edge of a print inserted through said opening, print guiding means in a first one of said containers, print feeding means intermediate said containers, and actuating means for moving said device to engage and immerse said print in said first bath and subsequently advance the opposite free edge of said print along said guiding means to said feeding means for feeding the same into another of said baths.

11. A photographic print treating apparatus, comprising a light-tight casing having therein a plurality of containers for print treating baths and an opening for receiving a print to be treated, a movable device having means for engaging the leading edge of a print inserted through said opening, print guiding means in a first one of said containers, print feeding means intermediate said containers, actuating means for moving said device to first engage said print and immerse the same in said first bath and to subsequently advance the opposite trailing edge thereof along said guiding means to said feeding means for feeding the same to another of said baths, movable means for immersing said print in said other bath, and a connection from said device to said movable means for operating the same in coordinated relation with each other.

12. A photographic print treating apparatus, comprising a light-tight casing having therein a plurality of containers for treating baths and an opening for receiving a print to be treated, an oscillating device provided with means operated by the oscillation thereof for engaging the leading edge of a print inserted through said opening, said device being located adjacent a first one of said containers, print guiding means in said first container, feeding means intermediate said containers, means movably mounted adjacent the other of said containers for immersing a print therein, actuating means for moving said device to engage and move said print through said first container and subsequently advance the trailing edge of said print along said guiding means to said feeding means, a cam movable with said device, and a connection operated by said cam for moving said immersing means in timed relation with the actuation of said device.

13. A photographic print treating apparatus, comprising a casing having a lower portion, and an upper portion separably supported thereon with a light-tight joint therebetween, said casing having an opening for receiving a print to be treated, a container for a print treating bath in the lower portion of said casing, a device mounted in the upper portion of said casing for rotary oscillation and provided with means for engaging an edge of a print fed through said opening, said device having a generally cylindrical outline with the lower portion of its periphery depending into said container, print guiding means in said container below said device, and means for oscillating said device in opposite directions to first wind a print on the periphery thereof to immerse the same in a bath in said container and to subsequently advance the opposite free edge of said print along said guiding means out of said bath.

14. A photographic print treating apparatus, comprising a casing having a lower portion, and an upper portion separably supported thereon with a light-tight joint therebetween, said casing having a print receiving opening, a plurality of containers for print treating baths in said lower container portion, a device having the general shape of a drum mounted for rotary oscillation in said upper casing portion with its lower peripheral portion depending into one of said containers, means on said device for gripping an edge of a print fed through said opening, means for feeding a print from the first mentioned container into another of said containers, print guiding means in the first mentioned container below said device, said device and guiding means having curved, foraminous surfaces adapted to support a print without sharply bending or adhering to the same, and means for oscillating said device in opposite directions to first wind a print thereon and immerse the same in a bath in the first mentioned container and for subsequently advancing the free opposite edge of said print over said guide means to said feeding means for feeding the same to said other container.

ARTHUR W. CAPS.
PAUL LANDROCK.